United States Patent
Reid et al.

(10) Patent No.: US 12,421,453 B2
(45) Date of Patent: Sep. 23, 2025

(54) CATIONIC GETTERING IN LIQUID CRYSTAL NCAP AND PDLC FILMS

(71) Applicant: Orbotech Ltd., Yavne (IL)

(72) Inventors: Jason S. Reid, San Jose, CA (US); Karla Gutierrez Cuevas, San Jose, CA (US); Nungavaram S. Viswanathan, San Jose, CA (US)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 17/892,558

(22) Filed: Aug. 22, 2022

(65) Prior Publication Data
US 2024/0117251 A1    Apr. 11, 2024

(51) Int. Cl.
*C09K 19/54* (2006.01)
*C03C 17/00* (2006.01)
(Continued)

(52) U.S. Cl.
CPC .......... *C09K 19/544* (2013.01); *C03C 17/007* (2013.01); *G02F 1/1334* (2013.01); *G02F 1/137* (2013.01); *C03C 2217/475* (2013.01); *C09K 2019/525* (2013.01); *C09K 2019/546* (2013.01); *G01N 21/9501* (2013.01); *G01N 2201/067* (2013.01); *G02F 1/133302* (2021.01)

(58) Field of Classification Search
CPC ............ C09K 19/544; C09K 2019/546; C03C 17/007; C03C 2217/475; G02F 1/1334; G02F 1/137; G02F 1/133302; G01N 2201/067
USPC ........................................................ 428/1.3
See application file for complete search history.

(56) References Cited

U.S. PATENT DOCUMENTS

| 3,972,589 A | 8/1976 | Skelly et al. |
| 6,151,153 A | 11/2000 | Bryan |

(Continued)

FOREIGN PATENT DOCUMENTS

| CN | 104531164 A | 4/2015 |
| DE | 112006001664 T5 | 5/2008 |

(Continued)

OTHER PUBLICATIONS

Catarina, et al., (2016) Improvement of permanent memory effect in PDLC films using TX-100 as an additive, Liquid Crystals, 43:1, 124-130, DOI: 10.1080/02678292.2015.1061713.
(Continued)

*Primary Examiner* — Ruiyun Zhang
(74) *Attorney, Agent, or Firm* — Suiter Swantz IP

(57) ABSTRACT

An electro-optic modulator is disclosed. The electro-optic modulator includes a modulator material film layer. The modulator material film layer includes a polymer matrix. Liquid crystals and getter molecules are dispersed within the polymer matrix. The liquid crystals are configured to modulate light transmissivity through the electro-optic modulator. The getter molecules capture or coordinate with cationic impurities present within the polymer matrix. By gettering the cationic impurities, switching of the device at modulated low frequencies are improved as well as a reduction on the switching voltage of the device. Three classes of getter molecules have been so far demonstrated to work: inorganic ion traps (dihydrogen ammonium phosphate), organic cation traps (EDTA), and organic ion extractors (nicotinic acid). An amount for the getter molecules may be 0.01 to 1.0 percent by weight of the polymer matrix.

11 Claims, 4 Drawing Sheets

(51) Int. Cl.
  *G02F 1/1334* (2006.01)
  *G02F 1/137* (2006.01)
  *C09K 19/52* (2006.01)
  *G01N 21/95* (2006.01)
  *G02F 1/1333* (2006.01)

(56) References Cited

U.S. PATENT DOCUMENTS

| | | |
|---|---|---|
| 6,211,991 B1 | 4/2001 | Bryan |
| 6,866,887 B1 | 3/2005 | Chen et al. |
| 7,099,067 B2 | 8/2006 | Chen |
| 7,807,335 B2 | 10/2010 | Corliss et al. |
| 7,817,333 B2 | 10/2010 | Chen |
| 7,989,038 B2 | 8/2011 | Yamashita et al. |
| 8,801,964 B2 | 8/2014 | Chen |
| 9,023,238 B2 | 5/2015 | Junge |
| 9,284,435 B2 | 3/2016 | Kim |
| 2004/0135962 A1 | 7/2004 | Kuntz et al. |
| 2008/0186563 A1 | 8/2008 | Chen |
| 2019/0278115 A1 | 9/2019 | Khan et al. |

FOREIGN PATENT DOCUMENTS

| | | |
|---|---|---|
| EP | 1541661 A1 | 6/2005 |
| KR | 20150059071 A | 5/2015 |

OTHER PUBLICATIONS

Drzaic, Paul S., Some Effects of Anchoring on Droplet Structure and Device Properties in Polymer-Dispersed Liquid Crystal Materials. Presented at 16th International Liquid Crystal Conference, Jun. 24-28, 1996, Kent State University, Kent, Ohio, B1.102, p. 110.

Silva, et al., (2015). Effect of an additive on the permanent memory effect of polymer dispersed liquid crystal films. Journal of Chemical Technology & Biotechnology, 90, 1565-1569.

European Patent Office, International Search Report and Written Opinion received in International Application No. PCT/IB2023/000509, Feb. 5, 2024, 10 pages.

CATIONIC GETTERING IN LIQUID CRYSTAL NCAP AND PDLC FILMS

TECHNICAL FIELD

The present invention generally relates to electro-optics, and more particularly to polymer dispersed liquid crystal materials for use in electro-optic applications.

BACKGROUND

Electro-optic modulators using liquid crystals particularly in NCAP or PDLC films for modulation are used to test conduction of thin-film transistors and interconnects of flat panel displays (FPD) under fabrication. The presence of metallic cations in the detection layer of the modulator stemming from variations in the incoming raw chemicals or formulation marginalities can have a deleterious effect on the modulator's performance by impacting dielectric performance. In particular, the metallic cations may be mobile within the electro-optic modulator in response to an electric field. The mobility of the cations may cause the cations to electrostatically shield liquid crystals of the electro-optic modulator. Therefore, it would be advantageous to provide a device, system, and method that cures the shortcomings described above.

SUMMARY

An electro-optic modulator is disclosed, in accordance with one or more illustrative embodiments of the present disclosure. In one illustrative embodiment, the electro-optic modulator includes a polymer matrix. In another illustrative embodiment, the electro-optic modulator includes liquid crystal molecules dispersed within the polymer matrix. In another illustrative embodiment, the electro-optic modulator includes getter molecules dispersed within the polymer matrix. In another illustrative embodiment, the getter molecules and the polymer matrix are each soluble in a solvent. In another illustrative embodiment, the getter molecules are insoluble in the liquid crystal molecules. In another illustrative embodiment, each of the getter molecules include a cation and an anion configured to getter one or more cationic impurities of the polymer matrix.

An imaging system is disclosed, in accordance with one or more embodiments of the present disclosure. In one illustrative embodiment, the imaging system includes an illumination source configured to generate illumination. In another illustrative embodiment, the imaging system includes a support for a sample. In another illustrative embodiment, the imaging system includes an electro-optic modulator disposed in a path of the illumination from the illumination source and separated from the sample by an air gap. In another illustrative embodiment, the electro-optic modulator includes a polymer matrix. In another illustrative embodiment, the electro-optic modulator includes liquid crystal molecules dispersed within the polymer matrix. In another illustrative embodiment, the electro-optic modulator includes getter molecules dispersed within the polymer matrix. In another illustrative embodiment, the getter molecules and the polymer matrix are each soluble in a solvent. In another illustrative embodiment, the getter molecules are insoluble in the liquid crystal molecules. In another illustrative embodiment, each of the getter molecules includes a cation and its counter-anion configured to getter one or more cationic impurities of the polymer matrix. In another illustrative embodiment, the getter molecules can include chelating interactions. In another illustrative embodiment, the imaging system includes a detector to generate an image of at least a portion of the sample.

A method of manufacturing an electro-optic modulator is disclosed, in accordance with one or more embodiments of the present disclosure. In one illustrative embodiment, the method includes adding getter molecules to a solution including polymer molecules dissolved in a solvent. In another illustrative embodiment, the method includes adding liquid crystals to the solution. In another illustrative embodiment, the method includes emulsifying the liquid crystals within the solution to disperse the liquid crystals to form a mixture. In another illustrative embodiment, the method includes coating a substrate with the mixture to form a film. In another illustrative embodiment, the method includes drying the film. In another illustrative embodiment, the film includes a polymer matrix formed from the polymer molecules. In another illustrative embodiment, the film includes the liquid crystal molecules dispersed within the polymer matrix. In another illustrative embodiment, the film includes the getter molecules dispersed within the polymer matrix. In another illustrative embodiment, the getter molecules are soluble in the solvent. In another illustrative embodiment, the getter molecules are insoluble in the liquid crystal molecules. In another illustrative embodiment, each of the getter molecules include an anion configured to getter one or more cationic impurities of the polymer matrix.

A polymeric composition is disclosed, in accordance with one or more embodiments of the present disclosure. In one illustrative embodiment, the polymeric composition includes a polymer matrix formed by cross-linking a plurality of molecules. In another illustrative embodiment, the polymeric composition includes getter molecules dispersed within the polymer matrix. In another illustrative embodiment, the getter molecules and the polymer matrix are each soluble in a solvent. In another illustrative embodiment, the solvent is water. In another illustrative embodiment, the getter molecules include a cation and an anion configured to getter one or more cationic impurities disposed within the polymer matrix.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
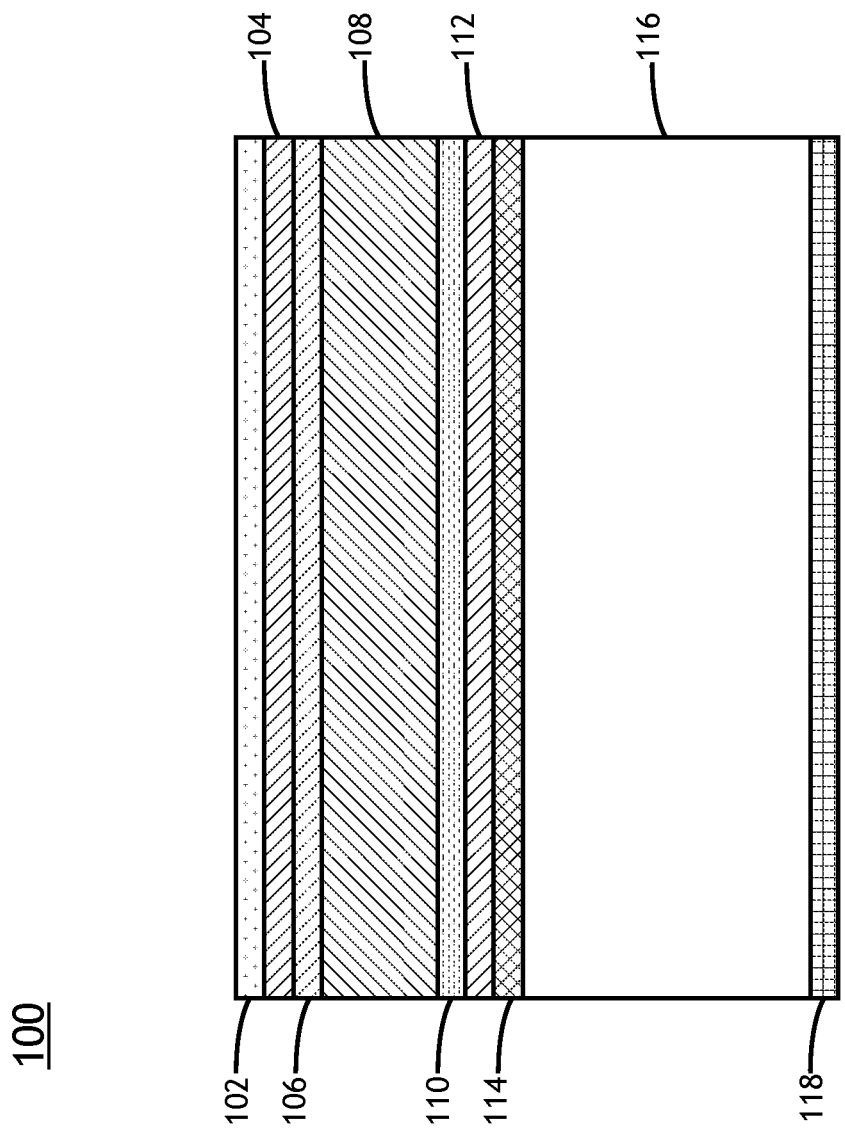
FIG. 1A illustrates a cross-section view of an electro-optic modulator, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

A polymer matrix of an electro-optic modulator based on nematic curvilinear aligned phase (NCAP) or polymer dispersed liquid crystal (PDLC) films may include cations or cationic impurities. The cationic impurities may be present within the polymer matrix based on how the polymer raw materials or the polymer matrix are made. For example, the polymer matrix may be formed by dissolving water-soluble polymer molecules in water to form an aqueous solution. The aqueous solution may be slightly alkaline (e.g., between pH 7.5 and pH 9). Fluctuations in the cationic content of the aqueous solution may vary based on several factors, such as, but not limited to, the incoming raw chemicals used to make the polymer matrix or formulation marginalities. The polymer matrix may include any type of cation, such as, but not limited to metallic cations. For example, the metallic cations may include sodium, potassium, magnesium, calcium, and the like. The cations may be electrically mobile within the polymer matrix. For example, potassium ions in the polymer matrix may be electrically mobile and drift in response to an electric field. By the mobility, the potassium cations may electromagnetically shield a liquid crystal dispersed within the polymer matrix. The electromagnetic shielding may impact switching characteristics of the electro-optical modulator which is undesirable. In particular switching characteristics of the electro-optical modulator may be suboptimal under certain pulsing schemes due to the sodium or potassium cation contamination. Thus, excessive ionic contamination in the polymer matrix of the electro-optic modulator has shown to degrade the switching performance with respect to turn-on voltages and responses to changes in the frequency of the electric field. Various getter molecules may be used as a solution to mitigate the effects of ions.

Embodiments of the present disclosure are generally directed to an electro-optic modulator including one or more getter molecules for capturing the cationic impurities present in the polymer matrix of the electro-optic modulator. The getter molecules may getter metallic cations present within the polymer matrix, such as, but not limited to, potassium cations. The getter molecules may also include a high solubility and/or reactivity with the polymer matrix, in particular when the polymer matrix is in aqueous solution, for gettering the metallic cations. The getter molecules may also be selected to minimize a change in pH of the aqueous solution. The anions of the getter molecules may getter, capture, or otherwise collect the cationic impurities present and mobile within the polymer matrix. It is further contemplated that the getter molecule may include one or more cations (e.g., ammonium) which passivate an electron trap state for one or more dangling bonds or other gap states which conduct through hopping. Passivating the electron trap state may reduce an electro-static shielding of one or more liquid-crystals (LCs) molecules dispersed within the polymer matrix, thereby reducing a threshold field and/or a hysteresis effect required to switch the liquid crystals. The reduced threshold field may improve a switching performance of the liquid crystals and the turn-on voltage required to align the liquid crystals may be reduced. The getter molecules may also possess a low solubility in the liquid crystal. The electro-optic modulator may be a component of an imaging system, also referred to as an automated optical inspection (AOI) system, a voltage imaging optical system (VIOS), an array checker, and the like. By reducing the turn-on voltage, process improvements of the optical inspection may similarly be improved. Embodiments of the present disclosure are also directed to methods of forming the electro-optic modulator.

Electro-optic modulators are generally described in U.S. Pat. No. 6,151,153, entitled "MODULATOR TRANSFER PROCESS AND ASSEMBLY", issued on Nov. 21, 2000; U.S. Pat. No. 6,211,991, entitled "MODULATOR MANUFACTURING PROCESS AND DEVICE", issued on Apr. 3, 2001, U.S. Pat. No. 6,866,887, entitled "METHOD FOR MANUFACTURING PDLC-BASED ELECTRO-OPTIC MODULATOR USING SPIN COATING", issued on Mar. 15, 2005; U.S. Pat. No. 7,099,067, entitled "SCRATCH AND MAR RESISTANT PDLC MODULATOR", issued on Aug. 29, 2006; U.S. Pat. No. 7,817,333, entitled "MODULATOR WITH IMPROVED SENSITIVITY AND LIFETIME", issued on Oct. 19, 2010; and U.S. Pat. No. 8,801,964, entitled "ENCAPSULATED POLYMER NETWORK LIQUID CRYSTAL MATERIAL, DEVICE AND APPLICATIONS", issued on Aug. 12, 2014, which are each incorporated herein by reference in the entirety.

FIG. 1A illustrates a cross-section view of an electro-optic modulator 100 including an ion getter material added to the polymer matrix of the electro-optic modulator 100, in accordance with one or more embodiments of the present disclosure. The electro-optic modulator 100 may include one or more layers, such as, but not limited to, a modulator material layer 108. The modulator material layer 108 may include a polymer matrix, liquid crystal droplets, and getter molecules. The polymer matrix may include cations or other cationic impurities which increase the driving voltage required to switch the liquid crystals dispersed therein. The getter molecules may be dispersed within the polymer matrix to getter the cations, thereby reducing the switching voltage. The getter molecules may include one or more properties, such as, but not limited to, an ability to disperse within the polymer matrix, solubility in water or host solvent, insolubility in the liquid crystal molecules, and/or an ability to getter (i.e., capture) the cations. A number of such getter molecules are contemplated and described herein.

In embodiments, the modulator material layer 108 may include one or more of the getter molecules. The getter molecules may include one or more anions to getter or otherwise chelate the cationic impurities from the matrix. To getter the cationic impurities, the getter molecule may generally include an anion. For example, the getter molecule may include the anion and a cation which is mobile in response to the electric field. The anion may then be free to getter the cationic impurities (e.g., potassium or other metallic cations) of the polymer matrix. In this regard, the cationic impurities become immobilized and neutralized with respect to charge. For example, the anion of the getter molecule may include any one of a phosphate, a carboxylate, a sulfate, a carbonate, a thiosulfate, a sulfite, an acetate, a borate, and the like. By way of another example, the cation may include any one of a hydrogen, an ammonium, a hydronium, alkyl, and the like. Accordingly, the addition of the getter molecules to the modulator material layer 108 of the electro-optic modulator may reduce a voltage required for switching the liquid crystals of the modulator material layer 108. The getter molecules may then provide improved switching characteristics of polymers with cationic impurities. It is contemplated the reduced voltage may be due to the cation of the getter molecule passivating one or more electron trap states, although this is not intended to be limiting.

In embodiments, the cation includes an organic group. In embodiments, the organic group includes a compound or group including two carbon atoms bonded together, where at least one carbon atom is bonded to at least one of hydrogen and/or a halogen. Additionally, one carbon atom may be bonded to at least one nitrogen atom by a single or double bond. The organic group may include any suitable organic group, such as, but not limited to an n-butyl, n-propyl, or isopropyl. Isopropyl p-toluenesulfonate, n-butyl acetate are examples of cation-anion combinations that can getter metallic cations.

In embodiments, the polymer matrix and the getter molecules are soluble in a common solvent. For example, the solvent may include water which forms an aqueous solution, although this is not intended to be limiting. The getter molecules may be water-soluble by including a polar molecule that is soluble in an aqueous solution (e.g., including the polymer molecules and water) to ionize and form the anion. The anion may include a negative charge for electrostatically coupling with cations present within the polymer matrix. Furthermore, by being water-soluble, the getter molecules may be dispersed within the polymer matrix, such as during emulsification of the liquid crystals. For example, the NCAP film may be formed from the aqueous solution.

In embodiments, the getter molecules may be compatible with the polymer molecules used to form the polymer matrix, such as, but not limited to, polyvinyl alcohol (PVA), a polyurethane, or polyacrylates. The getter molecules may also be compatible with one or more additives agents, such as, but not limited to, surface-activation agents used to formulate the polymer matrix. In embodiments, the getter molecules do not substantially alter the pH of the aqueous solution. In this regard, the polymer molecules dissolved in the aqueous solution may include a pH of between pH 7.5 and pH 9. By not affecting the pH of the aqueous solution, a cross-linking of the polymer molecules to form the polymer matrix may be similarly unaffected.

In embodiments, the getter molecules are insoluble within the liquid crystal material. By being insoluble in the liquid crystal material, the getter molecules may be prevented from interfering with the switching of the liquid crystal or act as an interfacial agent. By not acting as an interfacial agent, the getter molecules may have minimal impact on an anchoring or frictional force between the polymer matrix and the liquid crystals. Furthermore, the getter molecules are dispersed within the polymer matrix and not the liquid crystal. In some embodiments, the getter may enhance the hardness of the polymer matrix. For example, an NCAP film may be harder when the getter is present within the film.

It is contemplated that a number of getter molecules may be configured to getter one or more cations of the polymer matrix. The getter molecules may generally include a number of organic or inorganic compounds. The cationic abstraction may occur by one or more classes of getter molecules, such as, but not limited to, inorganic salts with cation reactivity, organic compounds with cation abstraction capability, or organic compounds with cationic extraction.

In embodiments, the getter molecule may include one or more organic or inorganic acids and/or salts thereof. The getter molecule may include a cation which is displaceable from an anion. The anion may then getter the cationic impurities of the polymer matrix. The getter molecule may be selected based on a pKa value. The pKa is a measure of acidity and provides an estimate of the stability of the anion formed in aqueous solution. For example, the getter molecule may include any of the chemicals provided in TABLE 1 and may further include a cation selected from one of hydrogen, ammonium, hydronium, or an organic group.

TABLE 1

| Chemical | pKa |
| --- | --- |
| Perchloric acid (HClO$_4$) | −10 |
| Hydrochloric acid (HCl) | −7 |
| Sulfuric acid (H$_2$SO$_4$) | −3.0 |
| Nitric acid (HNO$_3$) | −1.37 |
| Bisulfate ion (HSO$_4^-$) | 1.96 |
| Hydrofluoric acid (HF) | 3.18 |
| Acetic acid (CH$_3$COOH) | 4.75 |
| Dihydrogen phosphate (H$_2$PO$_4^-$) | 7.21 |
| Phosphoric acid (H$_3$PO$_4$) | 2.16, 7.20, & 12.37 |
| Tartaric acid (C$_4$H$_6$O$_6$) | 2.98 & 4.34 |
| Citric acid (C$_6$H$_8$O$_7$) | 3.13, 4.76, & 6.40 |
| Nicotinic Acid (C$_5$H$_4$NCOOH) | 2.9 |
| Dihydrogen Ammonium Phosphate (NH$_4$)(H$_2$PO$_4$) | 1.8 |
| EDTA (CH$_2$N(CH$_2$CO$_2$H)$_2$)$_2$ | 0, 1.5, 2.0, & 2.66 |
| p-toluene sulfonic acid | −2.1 |
| n-butyl acetate | −7 |
| n-propyl acetate | −7 |
| n-butyl aminoacetic acid | 2.29, 10.07 |

In some instances, the pKa values provide a basis for choosing the getter molecule. The getter molecule may be selected with a pKa value which is not too low and therefore does not substantially reduce the pH of the solution and similarly interfere with cross-linking. The getter molecule may be selected with a pKa value which is not too high and therefore does not cause insufficient disassociation or otherwise not providing enough getters for the impurities. The concentration may also be chosen as to not significantly change the pH such that crosslinking of the polymer is not significantly impeded. For example, the getter molecule may be selected to have a pKa between 0 and 3, such as Nicotinic Acid, Dihydrogen Ammonium Phosphate, or ethylenediaminetetraacetic acid (EDTA), although this is not intended to be limiting. The solubility and chemical compatibility may also provide a basis for choosing the getter molecule to avoid phase separation or further agglomeration of the polymer in solution. The extent of ionization and the equilibrium constants for ionization (Ka) may also provide a basis for choosing the cation of the chemicals. In this regard, buffer solutions may be made of compounds (or mixtures) for pH control and based on the ionic strength.

In embodiments, the getter molecule includes a phosphate group. The phosphate group may include any one of a phosphate ([PO$_4$]$^{3-}$), a hydrogen phosphate ([HPO$_4$]$^{2-}$), a dihydrogen phosphate ([H$_2$PO$_4$]$^{1-}$) or a phosphoric acid (H$_3$PO$_4$) with consideration to overall pH of the formulation to ensure adequate crosslinking. Similarly, the getter molecule may include a cation together with any one of the phosphate ([PO$_4$]$^{3-}$), a hydrogen phosphate ([HPO$_4$]$^{2-}$), a dihydrogen phosphate ([H$_2$PO$_4$]$^{1-}$), such as, but not limited to hydrogen, ammonium, or hydronium.

For example, the getter molecule may include ammonium dihydrogen phosphate. The ammonium dihydrogen phosphate may include a formulation according to the following:

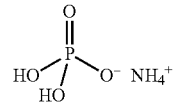

The ammonium dihydrogen phosphate has met with experimental success as the getter molecule. When the ammonium dihydrogen phosphate is added to the NCAP or PDLC film, the dihydrogen phosphate portion may getter the cationic impurities. Although the ammonium is a cation, the ammonium has been experimentally determined to not negatively impact switching characteristics, but rather improve the switching characteristics. It is contemplated that the improvement in the switching behavior may be due to the ammonium passivating one or more dangling bonds or other gap states. For example, the NCAP or PDLC film may include one or more dangling bonds (e.g., with an unfilled valence) or other gap states which may conduct through hopping. The dangling bonds may undesirably prevent conduction and charging. Therefore, the ammonium may improve the conduction and charging capability of the NCAP or PDLC film by passivation, although this is not intended to be limiting.

It is further contemplated that the getter molecule may include a sulfonic acid or a sulfonate salt thereof. The sulfonic acid may include a formulation according to the following, where R is an organic group:

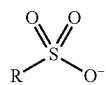

The sulfonic acid may be included in a number of chemicals, such as, but not limited to, a polystyrene sulfonate acid or a polystyrene sulfonate salt thereof. The polystyrene sulfonate may include a formulation according to the following:

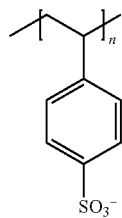

Amberlite resins may be based on such polystyrene sulfonic acids or salts thereof. The polystyrene sulfonate may generally include one or more cations such as, but not limited to, hydrogen, ammonium, or hydronium. For example, the getter molecule may include an ammonium polystyrene sulfonate.

In embodiments, the getter molecule includes a carboxylic acid group. The getter molecule including the carboxylic acid group may be soluble in water (e.g., an aqueous solution including the polymer) and may getter cationic impurities from the polymer matrix. The carboxylic acid group may be an organic acid that contains a carboxyl group attached to an R-group. A carboxylate may also be used as the getter molecule. The carboxylate may include a carboxylate group attached to an R-group. The carboxylate group may include an M, where M is selected from one of hydrogen, ammonium, or hydronium. The carboxylate may include a formulation according to the following:

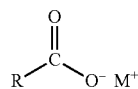

In embodiments, the getter molecule may include one or more organic compounds with cationic abstraction capability. Chelating agents are classes of compounds which reactively remove metal ions. The chelating agents may include an anion which is reactive with the cationic impurities of the polymer matrix or coordinate with a cation without the agent possessing an anion. For example, the chelating agent may include, but is not limited to, ethylenediaminetetraacetic acid (EDTA) or a salt thereof. The EDTA may include a multi-dentate structure for ion abstraction. Such multi-dentate structure may include four carboxylic acid groups and/or carboxylate salt groups which are each available as cationic receptor sites for abstracting or removing the cationic impurity. Thus, one or more of the carboxylic acid groups and/or carboxylate salt groups may act as an organic getter for potassium or other cationic impurities of the polymer matrix. Furthermore, the EDTA may include a suitable miscibility in water and sufficient purity. The EDTA may include a formulation according to the following:

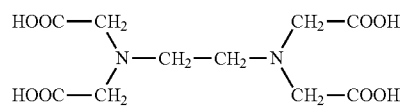

In embodiments, the getter molecule may include one or more organic compounds with cationic extraction capability. Ionophores are classes of molecules which are used in medicine for ion transportation. A number of such ionophores exist, such as, but not limited to Valinomycin. Valinomycin may be used as an ionophore for potassium. The Valinomycin may include a formulation according to the following:

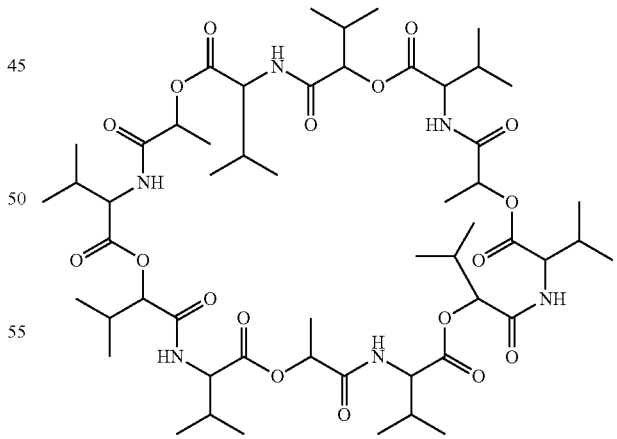

The ionophore may also include a nicotinic acid or a salt thereof. Nicotinic acid has been experimentally determined to function as a getter molecule for potassium ions in a polymer matrix. The nicotinic acid may include a carboxylic acid group which may act as an organic ion extractor for potassium or other cationic impurities of the polymer matrix. Similarly, the salt of the nicotinic acid may include a carboxylate salt groups. For example, the nicotinic acid may include a formulation according to the following:

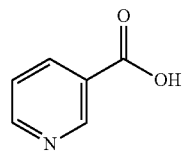

In embodiments, an amount of the getter molecules is added to the polymer matrix. The amount may be selected based on the content of cationic impurities present within the aqueous solution. For example, getter molecules having between 0.01 and 1.0 percent of the polymer matrix may be added to the aqueous solution. The getter molecules may be added during the initial stages of the electro-optic modulator formulation, such as, but not limited to, prior to adding the liquid crystals to the aqueous solution.

Thus, the modulator material layer 108 may include one or more of the polymer matrix, the liquid crystals, and one or more getter molecules. In embodiments, the electro-optic modulator 100 may include one or more films, layers, or coatings in addition to the modulator material layer 108. For example, the electro-optic modulator 100 may include one or more of a hard coating layer 102, a plastic film 104, a dielectric mirror film 106, a modulator material layer 108, a transparent conductive layer 110, a plastic film 112, an optical adhesive 114, a glass substrate 116, and/or an anti-reflective coating 118. The electro-optic modulator 100 may thus include one or more film layers which permit the transmissivity of light. Light transmission through the modulator material layer 108 may also change in accordance with a magnitude of an electric field felt by liquid crystals of the modulator material layer 108. It is further contemplated that the electro-optic modulator is not intended to be limited to the films, layers, or coatings described above.

The modulator material layer 108 (also referred to as a sensor layer, liquid crystal layer, polymer matrix layer, and the like) can be applied onto the glass substrate 116 by a number of methods, such as, but not limited to, by direct coating or lamination. Embodiments made with a lamination process include first coating the plastic film 112 (e.g., polyethylene terephthalate (PET), also known as Mylar) having the transparent conductive layer 110 with the modulator material layer. The transparent conductive layer 110 may generally include any material which is optically transparent and conductive to act as an electrode, such as, but not limited to, indium tin oxide (ITO). The modulator material layer 108 may include an NCAP mixture or a PDLC mixture. The plastic film 112, and similarly the transparent conductive layer 110 and the modulator material layer 108, may be laminated on the glass substrate 116 by the optical adhesive 114. The dielectric mirror film 106 (or pellicle) may be formed on the plastic film 104, and then added to the modulator material layer 108 of the assembly stack. The dielectric mirror coating may be deposited by a physical vapor deposition, or like process. In embodiments, a vacuum assisted attachment process is used. The dielectric mirror film 106 may capacitively couple with a sample to induce a localized voltage. The localized voltage may then cause the liquid crystals in the modulator material layer 108 to align. The anti-reflective coating 118 may be applied to the bottom surface of a glass substrate 116. Similarly, the hard coating layer 102 may be cured to the plastic film 104. The hard coating layer 102 may include a major hard coating and a thinner slip agent layer.

Figure 1B:
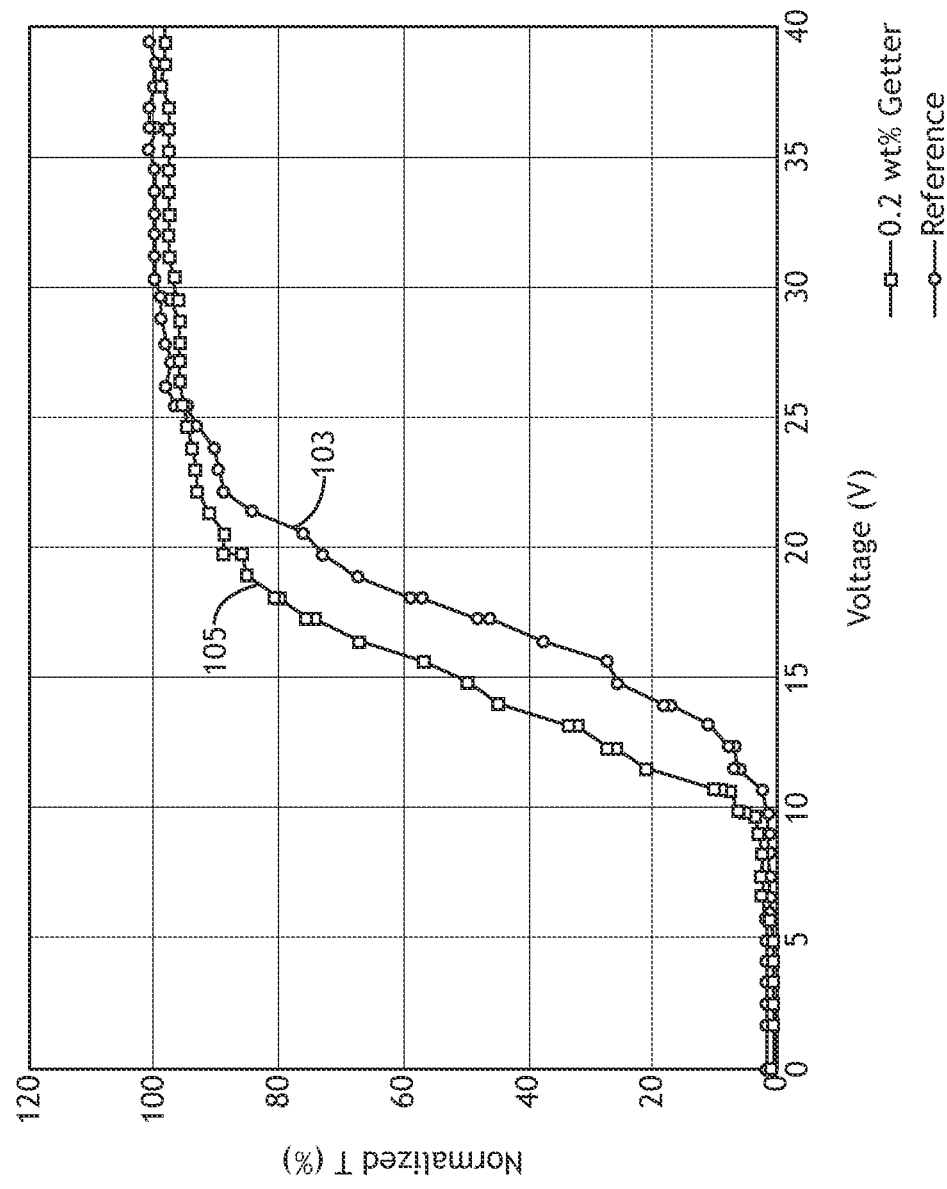
FIG. 1B illustrates a transmittance versus voltage graph for an electro-optic modulator with and without the getter molecules of the present disclosure, in accordance with one or more embodiments of the present disclosure.

Referring now to FIG. 1B, a transmittance versus voltage graph 101 is illustrated, in accordance with one or more embodiments of the present disclosure. The graph 101 depicts the normalized transmittance of the electro-optic modulator 100 as a function of voltage without and with the getter molecule. Curve 103 represents a reference V-T curve obtained from an electro-optic modulator containing no getter molecule within the NCAP film. Curve 105 represents a V-T curve obtained from the electro-optic modulator including a 0.2% getter molecule concentration in the NCAP film. As shown in graph 101, the presence of the getter molecule in the electro-optic modulator allows for the achievement of sufficient transmittance at a lower voltage than is required in the non-gettering case.

Figure 2:
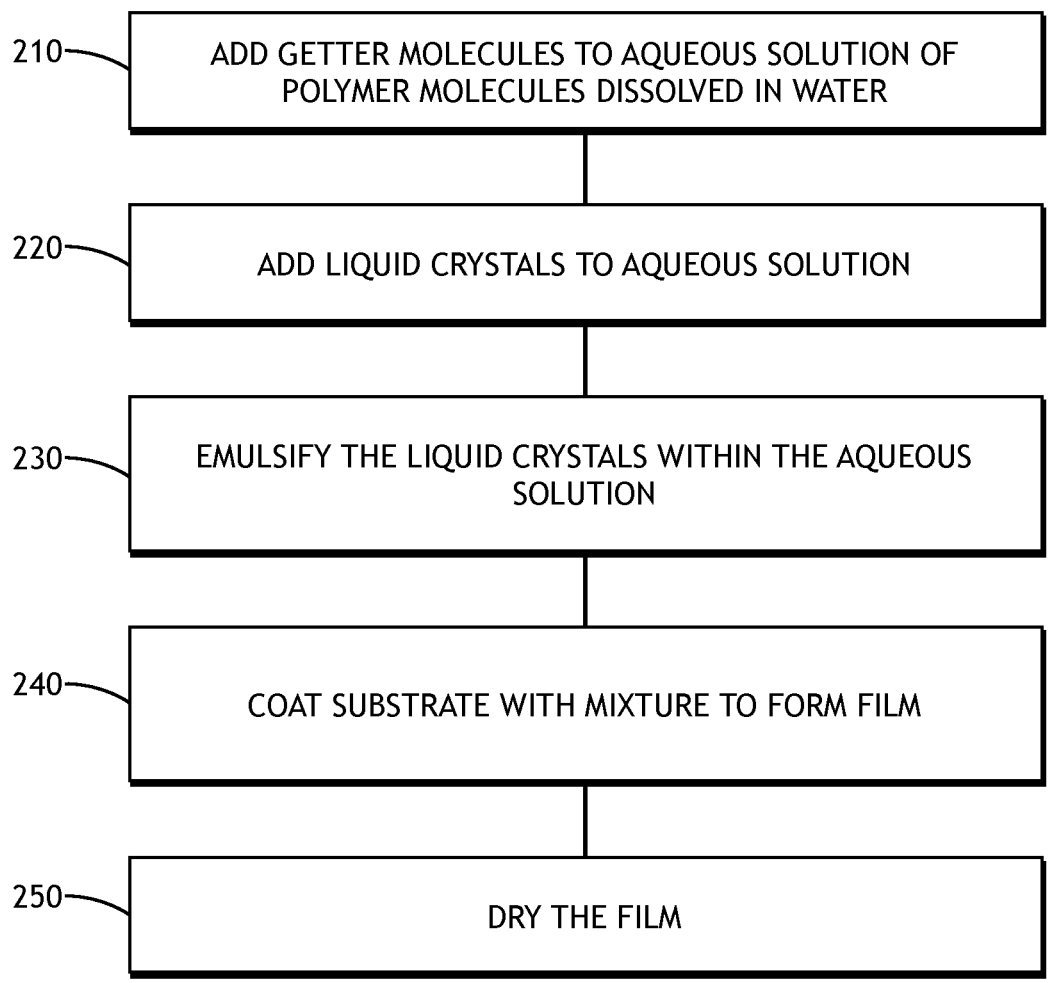
FIG. 2 illustrates a flow diagram of a method for making an electro-optic modulator, in accordance with one or more embodiments of the present disclosure.

FIG. 2 is a flow diagram illustrating steps performed in a method 200 for making an electro-optic modulator, in accordance with one or more embodiments of the present disclosure. The embodiments and the enabling technologies described previously herein in the context of the electro-optic modulator 100 should be interpreted to extend to the method 200. It is further noted, however, that the method 200 is not limited to the architecture of the electro-optic modulator 100.

In a step 210, getter molecules are added to a solution of polymer molecules dissolved in a solvent. For example, the polymer dissolved in solvent may be a polyvinyl alcohol (PVA) or a urethane dissolved in water to form an aqueous solution. It is further contemplated that the solvent may be another solvent used for the formulation of PDLC films, such as, but not limited to, a solvent for latex polymers, monomers, and the like. The solution may be a homogenous solution. In embodiments, the getter molecules may be any getter molecule previously described herein. For example, the getter molecules may include a number of formulations, such as, but not limited to, nicotinic acid or another nicotinate (e.g., ammonium nicotinate), an ethylenediaminetetraacetic acid (EDTA) or another ethylenediaminetetraacetate (e.g., n-ammonium ethylenediaminetetraacetate), an imminodisuccinic acid, a polyaspartic acid, a valinomycin, a dihydrogen phosphate (e.g., ammonium dihydrogen phosphate), and/or a polystyrene sulfonic acid or another polystyrene sulfonate (e.g., ammonium polystyrene sulfonate). The getter molecules may also be insoluble in a liquid crystal. The getter molecules may be added based on a relative weight of the getter molecules and the polymer molecules. For example, the getter molecules include between 0.01 and 1.0 percentage by weight of the polymer molecules.

In a step 220, liquid crystals are added to the aqueous solution to form a mixture. The combination of the liquid crystals and the aqueous solution may be a two-phase mixture. In this regard, the liquid crystals may be relatively immiscible with the aqueous solution. The liquid crystals may include any liquid crystal composite material, such as, but not limited to an NCAP material (e.g., water-soluble polymer-based NCAP material or a latex polymer-based NCAP) or a PDLC material. The liquid crystals may form droplets which may include several molecules of the liquid crystal material.

In a step 230, the liquid crystal material is emulsified within the polymer material. By emulsifying the liquid crystal material, an electrical performance of the liquid crystal material may be improved. The liquid crystal may form smaller droplets (on the order of 1 to 10 microns in size) that are dispersed within the polymer material. The liquid crystal molecules may be randomly oriented within the droplet when no electric field is applied. The liquid crystal/polymer materials may be emulsified in any manner, such as, but not limited to, using a mechanical force by a high-speed blade.

In a step 240, the emulsified mixture is applied to a substrate. The emulsified mixture may be applied as a thin coating (on the order of ten microns thick). For example, the thin coating may be applied by spin coating process, or the like.

In a step 250, the film is dried. By drying the film, water in the thin coating is evaporated. Upon evaporation of the water, the liquid crystal remains dispersed within the polymer matrix. The liquid crystal molecules may anchor to the polymer matrix. A degree of anchoring depends on the liquid crystal molecule and polymer chemistries. When an electric field is applied across the liquid crystal material, the liquid crystal molecules and/or droplets can at least partially align along the electric field direction. For such alignment to occur, the liquid crystal molecules and/or droplets overcome the anchoring and/or friction with the polymer at an attachment locus.

In embodiments, the getter molecules may also be dispersed within the polymer matrix upon evaporation of the water. The getter molecules may also getter cationic contamination present within the polymer matrix. By gettering the cationic contamination, an electromagnetic shielding of the liquid crystal molecules may be reduced. Thus, a switching voltage of the film may be improved, as compared to an electro-optic modulator without getter molecules. Upon curing of the film, the getter molecules may reside in the polymer matrix and readily collect stray cations in proximity, effectivity squelching the mobility of the cations and neutralizing their charge. The ions are then no longer able to move under the AC electric field during modulator operation with the effect more pronounced as frequency is decreased, and cannot electrostatically shield the liquid crystal from switching.

It is further contemplated that each of the embodiments of the method described above may include any other step(s) of any other method(s) described herein. For example, it is contemplated that the getter molecules may be added to the aqueous solution before, contemporaneous with, or after the liquid crystals are added to the aqueous solution.

Figure 3:
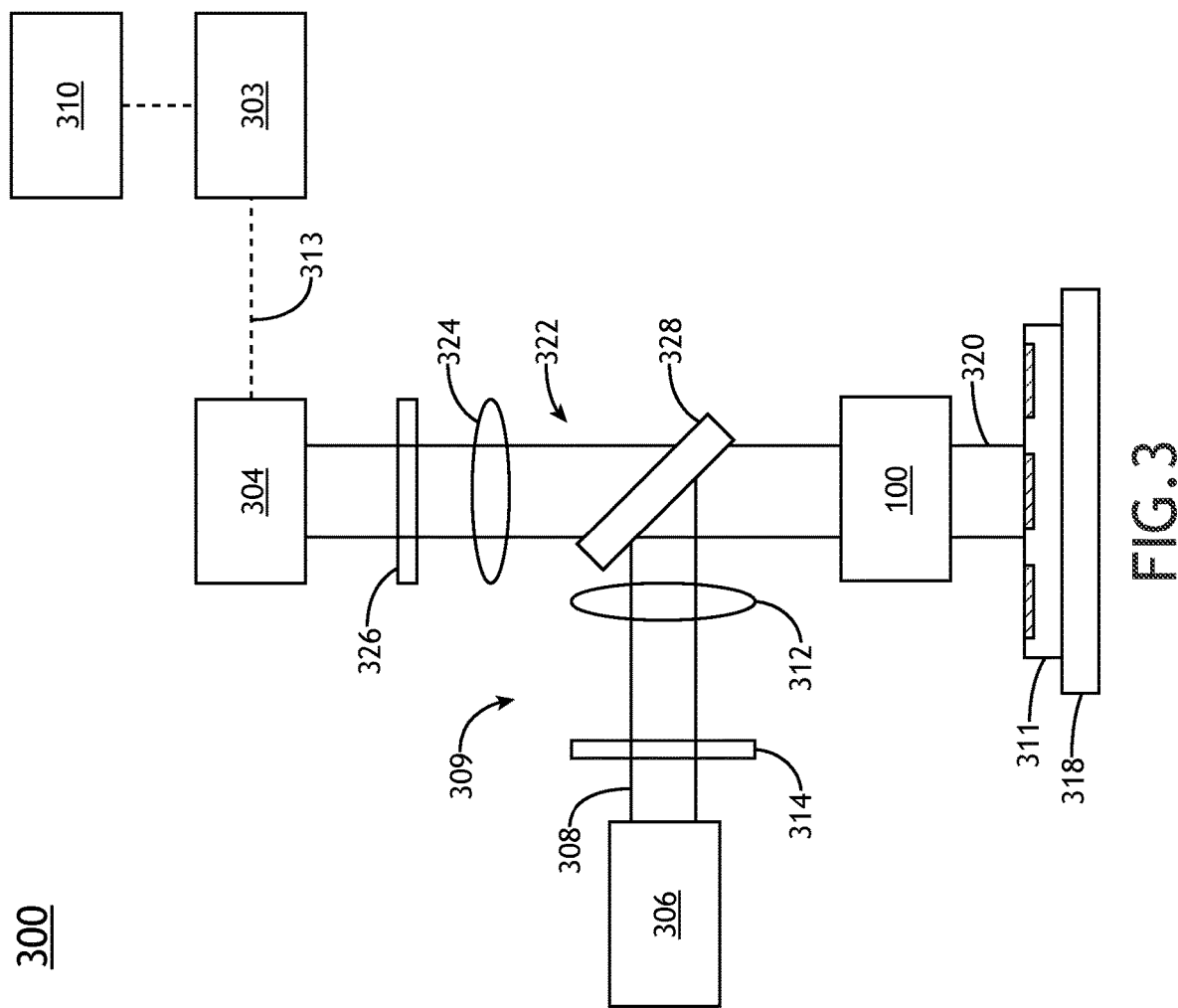
FIG. 3 illustrates a simplified view of an imaging system, in accordance with one or more embodiments of the present disclosure.

FIG. 3 is a conceptual view illustrating an imaging system 300, in accordance with one or more embodiments of the present disclosure. For the purposes of the present disclosure, the term 'imaging system' is interchangeable with the term 'imaging tool.' The imaging system 300 may generally include any type of imaging tool suitable, such as, but not limited to, voltage imaging. Voltage imaging may be employed to detect and measure defects in flat panel thin film transistors (TFT) arrays. The performance of the TFT array is simulated as if it were assembled into a TFT cell and then the characteristics of the TFT array are measured by indirectly measuring actual voltage distribution on the panel, or so-called voltage imaging, using an electro-optic modulator (e.g., electro-optic modulator 100). The voltage imaging may be performed by the imaging system 300. The imaging system 300 may include one or more components for checking such TFT arrays or other samples.

The electro-optic modulator 100 may be advantageous for a number of imaging tasks, such as to modulate a light source of the imaging system 300 to assist in detecting one or more defects of a sample 311, such as, but not limited to, thin film transistor (TFT) arrays, liquid crystal display (LCD) panels, and the like. The TFT arrays may be formed on a substrate, such as a clear plate of thin glass. The TFT arrays may include one or more printed layers. The printed layers may be formed on the substrate by a number of processes, such as, but not limited to, one or more material deposition steps, one or more lithography steps, one or more etching steps, and the like. The fabrication may occur in stages, where a material (e.g., indium tin oxide (ITO), etc.) is deposited over a previous layer or on the glass substrate, according to a process pattern. During fabrication, the printed layers are fabricated within selected tolerances to properly construct the final device. The printed layers may exhibit defects which are outside of the selected tolerances. Characteristics of the TFT array may be measured by the imaging system 300 to detect the defects.

In embodiments, the imaging system 300 includes an illumination source 306 to generate illumination 308. The illumination 308 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 306 may further generate illumination 308 including any range of selected wavelengths. In embodiments, the illumination source 306 may include a spectrally-tunable illumination source to generate illumination 308 having a tunable spectrum.

In embodiments, the illumination source 306 directs the illumination 308 to a sample 311 via an illumination pathway 309. The illumination pathway 309 may include one or more lenses 312 or additional illumination optical components 314 suitable for modifying and/or conditioning the illumination 308. For example, the one or more illumination optical components 314 may include, but are not limited to, one or more polarizers, one or more filters, one or more splitters, one or more diffusers, one or more homogenizers, one or more apodizers, one or more shapers, one or more shutters (e.g., mechanical shutters, electro-optical shutters, acousto-optical shutters, or the like), one or more aperture stops, and/or one or more field stops.

In embodiments, the imaging system 300 includes the electro-optic modulator 100. The electro-optic modulator 100 may modulate one or more characteristics of the illumination 308. During operation, light transmits through portions of the electro-optical modulator 100, and defects can be detected by observing changes in the reflected or transmitted light. The electro-optic modulator 100 may be placed a select number of microns (e.g., between 5-75 microns) above the surface of the sample 311 (e.g., the TFT array), and a voltage bias is applied across a transparent electrode of a layer of indium tin oxide (hereinafter "ITO") on a surface of the electro-optic modulator 100. Thereupon, the electro-optic modulator 100 capacitively couples to the sample 311 so that an electric field associated with the sample 311 is sensed by one or more layers of the electro-optic modulator 100 (e.g., a layer including liquid crystals). The intensity of incident light transmitted through the liquid crystals of the electro-optic modulator are varied, (i.e., modulated), based on the electric field strength felt by the liquid crystals. For example, in areas where a normal pixel is located, a localized voltage potential is impressed (e.g., a capacitive coupling between the sample 311 and the electro-optic modulator 100) causing one or more films of the electro-optical modulator 100 to be locally translucent. In the locally translucent regions, light from the light source 306 is allowed to pass through the electro-optical modulator 100 and reflect from the sample 311, for passing through to a collection pathway 322 (e.g., for capture by detector 304).

By way of another example, in areas where no voltage potential is impressed (e.g., no capacitive coupling), one or more films of the electro-optical modulator 100 remains locally opaque. In the case where the electro-optical modulator 100 is locally opaque, light from light source 306 is scattered or otherwise prevented from passing through to the sample 311. Thus, a transmission-voltage (T-V) curve may be determined by applying the voltage. The intrinsic switching voltage of the electro-optic modulator 100 may correspond to the voltage across the electro-optic modulator 100 at which light transmission through the electro-optic modulator 100 has a maximum sensitivity to a change in voltage. For example, the switching voltage may correspond to the electric field strength at which a given percentage of liquid crystal molecules are substantially aligned with the electric field allowing for the light transmission.

In embodiments, the sample 311 includes a thin-film transistor (TFT) array. For example, the sample 311 may include pixel elements disposed between inactive regions. The sample stage 318 may include any device suitable for positioning the sample 311 within the imaging system 300.

In embodiments, a detector 304 is configured to capture radiation emanating from the sample 311 (e.g., sample light 320) through a collection pathway 322. For example, the collection pathway 322 may include, but is not required to include, the electro-optic modulator 100, a collection lens (e.g., an objective lens), or one or more additional collection pathway lenses 324. In this regard, a detector 304 may receive radiation reflected or scattered (e.g., via specular reflection, diffuse reflection, and the like) from the sample 311 or generated by the sample 311 (e.g., luminescence associated with absorption of the illumination 308, or the like).

The system 300 may include, but is not limited to, a controller 303. The controller 303 may include one or more processors and memory, and may include or be coupled to a user interface 310.

The collection pathway 322 may further include any number of collection optical components 326 to direct and/or modify illumination collected by the electro-optic modulator 100 including, but not limited to one or more collection pathway lenses 324, one or more filters, one or more polarizers, or one or more blocks. Additionally, the collection pathway 322 may include field stops to control the spatial extent of the sample imaged onto the detector 304 or aperture stops to control the angular extent of illumination from the sample used to generate an image on the detector 304. In another embodiment, the collection pathway 322 includes an aperture stop located in a plane conjugate to the back focal plane of an optical element to provide telecentric imaging of the sample. In embodiments, the imaging system 300 includes a beam splitter 328 oriented such that the electro-optic modulator 100 may simultaneously direct the illumination 308 to the sample 311 and collect radiation emanating from the sample 311.

The detector 304 may include any type of optical detector suitable for measuring illumination received from the sample 311. For example, the detector 304 may include, but is not limited to, a CCD detector, a TDI detector, a photo-multiplier tube (PMT), an avalanche photodiode (APD), a complementary metal-oxide-semiconductor (CMOS) sensor, or the like. In another embodiment, the detector 304 may include a spectroscopic detector suitable for identifying wavelengths of light emanating from the sample 311.

In embodiments, the controller 303 is communicatively coupled to a detector 304. The controller 303 may include one or more processors configured to execute any of various process steps. In embodiments, the controller 303 is configured to generate and provide one or more control signals configured to perform one or more adjustments to one or more process tools based on image signals 313 from the detector 304.

The one or more processors of the controller 303 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the imaging system 300, as described throughout the present disclosure. Moreover, different subsystems of the system 300 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 303 may include one or more controllers housed in a common housing or within multiple housings. In this way, any controller or combination of controllers may be separately packaged as a module suitable for integration into imaging system 300. Further, the controller 303 may analyze data received from the detector 304 and feed the data to additional components within the imaging system 300 or external to the imaging system 300.

The memory medium may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors and controller. For instance, the one or more processors of controller 303 may access a remote memory (e.g., server), accessible through a network (e.g., internet, intranet and the like).

In embodiments, the user interface 310 is communicatively coupled to the controller 303. In embodiments, the user interface 310 may include, but is not limited to, one or more desktops, laptops, tablets, and the like. In embodiments, the user interface 310 includes a display used to display data of the system 300 to a user. The display of the user interface 310 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 310 is suitable for implementation in the present disclosure. In embodiments, a user may input selections and/or instructions responsive to data displayed to the user via a user input device of the user interface 310.

Referring generally again to FIGS. 1A-3, although the getter molecules have been described as being added to electro-optic modulators of imaging systems, this is not intended as a limitation of the present disclosure. It is further contemplated that the getter molecules may be added to a number of aqueous based polymers. By adding the getter molecule to the aqueous based polymer, the dielectric properties of an aqueous-based polymer may be improved. For example, the current leakage or dielectric losses of the aqueous based polymer may be of concern. By addition of the getter molecules, dielectric properties, such as capacitance, of the aqueous based polymer may be improved. Thus, the getter molecules may address problems associated with free cations, such as capacitance or fouling. Such aqueous-based polymer may include a number of beneficial applications, such as, smart-window technology, sensors, or other nematic curvilinear aligned phase liquid crystal (NCAP) films. In solvent-based systems, polymer dispersed liquid crystal (PSLCs) films, polymer stabilized liquid crystal (PSLCs) could be similarly improved.

Gettering may be beneficial in a number of polymeric compositions. The polymeric composition may include a polymer matrix formed by cross-linking a plurality of polymer molecules. The polymeric composition may also include getter molecules dispersed within the polymer matrix. The getter molecules and the polymer matrix may each soluble in a solvent, such as, but not limited to, water. Each of the getter molecules may include a cation and an anion. The anion may be configured to getter one or more cationic impurities disposed within the polymer matrix. In embodiments, the getter molecules include between 0.01 and 1.0 percentage by weight of the polymer matrix, although this is not intended to be limiting. In embodiments, the anion includes at least one of a phosphate, a carboxylate, a sulfate, a carbonate, a thiosulfate, a sulfite, an acetate, or a borate. In embodiments, the cation is one of hydrogen, ammonium, hydronium, or an organic group. In embodiments, the plurality of getter molecules is at least one of a nicotinic acid, a nicotinate, an ethylenediaminetetraacetic acid (EDTA), an ammonium dihydrogen phosphate, a polystyrene sulfonic acid, a polystyrene sulfonate, or a valinomycin. The getter molecules may include a pKa value between 0 and 3, although this is not intended to be limiting.

Modulator material layers may include a polymer matrix and liquid crystals dispersed within the polymer matrix. An intrinsic switching voltage of the liquid crystals may correspond to a voltage across the modulator material layer at which light transmission through electro-optic modulator has a maximum sensitivity to changes in the voltage. The sensitivity can be improved by reducing the intrinsic switching voltage of the liquid crystal material. The operating voltage and sensitivity of liquid crystal materials may be related to one or more factors, such as, but not limited to, properties of the liquid crystal, properties of the polymer matrix, a liquid crystal droplet size distribution in the polymer matrix, and/or interface properties between the polymer matrix the liquid crystal.

Modulator material layers may include one or more classes of material. Liquid crystal/polymer composite materials may generally be separated into a polymer dispersed liquid crystal (PDLC) materials class and a nematic curvilinear aligned phase liquid crystal (NCAP) materials class. Each of the PDLC materials and the NCAP materials may generally include liquid crystal droplets dispersed within a polymer matrix.

The PDLC material or film may be fabricated in a number of ways. For example, the PDLC material may be fabricated by solvent induced phase separation (SIPS). The SIPS process may include dissolving a liquid crystal (LC) and polymer in a common solvent and then evaporating the solvent to allow the LC droplets to form. The getter molecule may also be selected to be soluble in the common solvent. In some instances, the solvent is water, although this is not intended to be limiting. To further improve mechanical properties (such as toughness) of the final PDLC film, polymers that can be cross-linked are often used. By way of another example, the PDLC material may be fabricated by polymerization induced phase separation (PIPS). The PIPS process may include mixing LC and pre-polymers (and/or monomers), applying radiation (e.g., ultraviolet light) to the mixture. The PIPS process may also include a mixture of catalyst, LC and pre-polymer followed by heat to form the PDLC film. By way of another example, the PDLC material may be fabricated by thermal induced phase separation (TIPS). The TIPS process may include heating a mixture of polymer and LC until the mixture becomes homogenous. The LC is then phase separated from the polymer during the cooling process.

The NCAP material or film may be suitable for making very large area light valves and displays. The NCAP material or film is generally water-based, and can be further divided into a number of subclasses. For example, a subclass of NCAP materials includes a water-soluble polymer, such as polyvinyl alcohol (PVA) or a urethane. The water-soluble polymer may be moisture sensitive because of the hydrophilic property of the water-soluble polymer. By way of another example, a subclass of NCAP materials includes a latex-based material. The latex-based material includes a water-insoluble polymer. Latex particles may be dispersed in water with the liquid crystal. These latex particles can "fuse" into continuous polymer phase that is irreversible once the water is removed. Some applications using this latex-based NCAP have long-term electro-optical stability.

The liquid crystal material may include any liquid crystal material. For example, the liquid crystal may include, but is not limited to, one or more of a nematic liquid crystal, a ferroelectric liquid crystal, a Blue Phase liquid crystal, a mixture of liquid crystal and dichroic dye, a cholesteric liquid crystal, and the like. For dichroic dye and liquid crystal mixtures, the dichroic dye may absorb light in the off-state and transmits light in the on-state, which will improve the light transmission voltage sensitivity corresponding to slope of s-curve by using higher light intensity. The liquid crystal material can be substantially hydrophobic such that droplets of the liquid crystal material can be formed with the emulsion, and such that the prepolymer and photo-initiator can be substantially dissolved in the liquid crystal droplets. The prepolymer and photo-initiator can be substantially hydrophobic, such that the liquid crystal droplets of the emulsion comprise most of the photo-initiator and prepolymer mixture.

The polymer matrix material may include any polymer material. For example, the polymer matrix material may include, but is not limited to, one or more water-based polymers, such as poly vinyl alcohol (PVA) or a urethane, or a water-based latex, such as Neorez R-967 (manufactured by NeoResins, a division of DSM.). The amount of polymer matrix material may correspond to the strength and rigidity of the sensor material. The weight ratio of liquid crystal material to polymer matrix material can be within a range from about 50/50 to about 80/20, for example. The increased amount of polymer matrix material can increase the strength of the sensor material and the operating voltage. The polymer matrix may be water soluble in water to form an aqueous mixture. During the formation of the modulator material layer 108, one or more surfactants (e.g., wetting agents), may be added to the aqueous mixture. The surfactants may improve an ability of the modulator material layer 108 to spread, due to a reduced surface tension.

As used throughout the present disclosure, the term "sample" generally refers to a substrate formed of a semiconductor or non-semiconductor material (e.g., thin filmed glass, or the like). For example, a semiconductor or non-semiconductor material may include, but is not limited to, monocrystalline silicon, gallium arsenide, indium phosphide, or a glass material. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An electro-optic modulator comprising:
a polymer matrix formed by cross-linking a plurality of polymer molecules;
a plurality of liquid crystal molecules dispersed within the polymer matrix; and
a plurality of getter molecules dispersed within the polymer matrix, wherein the plurality of getter molecules and the polymer matrix are each soluble in a solvent, wherein the plurality of getter molecules are insoluble in the plurality of liquid crystal molecules, wherein each of the plurality of getter molecules include a cation and an anion configured to getter one or more cationic impurities disposed within the polymer matrix, wherein the plurality of getter molecules comprises one of a nicotinic acid, a nicotinate, or ethylenediaminetetraacetic acid.

2. The electro-optic modulator of claim 1, wherein the solvent comprises water, wherein the electro-optic modulator comprises a nematic curvilinear aligned phase (NCAP) film, wherein the plurality of getter molecules includes a pKa value between 0 and 3.

3. The electro-optic modulator of claim 1, wherein the plurality of getter molecules contains a chelating agent.

4. The electro-optic modulator of claim 1, wherein the plurality of getter molecules comprises valinomycin.

5. The electro-optic modulator of claim 1, wherein the plurality of getter molecules comprises between 0.01 and 1.0 percentage by weight of the polymer matrix.

6. The electro-optic modulator of claim 1, wherein the polymer matrix, the plurality of liquid crystal molecules, and the plurality of getter molecules form a modulator material layer.

7. The electro-optic modulator of claim 6, further comprising a glass substrate, wherein the modulator material layer is one of a direct coating onto the glass substrate or a lamination onto the glass substrate.

8. The electro-optic modulator of claim 7, further comprising a dielectric mirror film laminated on top of the modulator material layer, wherein the plurality of liquid crystal molecules are configured to align for selectively modulating light in response to receiving a voltage through the dielectric mirror film.

9. The electro-optic modulator of claim 1, wherein the anion includes at least one of a phosphate, a carboxylate, a sulfate, a carbonate, a thiosulfate, a sulfite, an acetate, or a borate.

10. The electro-optic modulator of claim 1, wherein the cation is one of hydrogen, ammonium, hydronium, or an organic group.

11. The electro-optic modulator of claim 10, wherein the ammonium is configured to passivate a trap state of the polymer matrix thereby reducing a threshold field or hysteresis for switching the plurality of liquid crystals.

* * * * *